Feb. 2, 1971 P. J. BURKHARDT 3,560,364

METHOD FOR PREPARING THIN UNSUPPORTED FILMS OF SILICON NITRIDE

Filed Oct. 10, 1968

INVENTOR
PAUL J. BURKHARDT

BY A. Sidney Alpert

ATTORNEY

United States Patent Office 3,560,364
Patented Feb. 2, 1971

3,560,364

METHOD FOR PREPARING THIN UNSUPPORTED FILMS OF SILICON NITRIDE

Paul J. Burkhardt, Poughkeepsie, N.Y., assignor to International Business Machines Corporation, Armonk, N.Y., a corporation of New York Filed Oct. 10, 1968, Ser. No. 766,413
Int. Cl. B29c *1/08;* C23c *15/00*
U.S. Cl. 204—192 4 Claims

ABSTRACT OF THE DISCLOSURE

A method is provided for producing extremely thin, free-standing or unsupported films of silicon nitride, having the formula $Si_3N_4$. The method includes the initial step of sputtered depositing, on a molybdenum substrate, a thin layer of silicon nitride. The assembly is then located in an oven, heated to a temperature ranging from 500° C. to 900° C., and chlorine gas introduced into the oven. In this manner, gaseous dissolution of the substrate is effected, resulting in the production of the free-standing film of silicon nitride.

BACKGROUND OF THE INVENTION

This invention relates generally to the field of forming unsupported or free-standing films, and more particularly to a method of producing free-standing, extremely thin, films of silicon nitride.

It is known that free-standing dielectric films may be useful in the fabrication of capacitors or other electrical devices. The only available thin free-standing films, within present knowledge, are those so-called "plastic" films such as Mylar, Parylene and certain glass films. The plastic films suffer from several common deficiencies, including their inability to withstand high temperatures, and the glass films also present deficiencies since they cannot be made thin enough for many applications.

According to the present invention, there is produced a free-standing or unsupported film having a thickness on the order of 50 angstroms (A.) to 20 microns. The film is silicon nitride, of the formula $Si_3N_4$. It has certain desirable characteristics, besides being extremely thin, that make it especially suitable for applications that have previously been unknown because of the unavailability of suitable free-standing films. Among these characteristics are a high melting temperature (approximately 1900° C.), low density, a low thermal coefficient, high dielectric strength, flexibility and transparency to the visible spectrum.

By virtue of these desirable, and heretofore unavailable, characteristics of the free-standing film produced in accordance with the present invention, certain applications and products are foreseen. For example, the film's low density will lead to its use as a radiation window that permits lower energy particles to be transmitted than can be transmitted through an equivalent thickness of gold or most other present radiation window material. Additionally, by virtue of its flexibility and high dielectric strength, it will find use in thin film capacitor applications. In this regard, it has been found that the subject free-standing silicon nitride film exhibits a "soft" or slow breakdown under excessive voltage, which permits recovery prior to complete breakdown.

SUMMARY OF THE INVENTION

According to the preferred embodiment, there is provided a method of producing thin (i.e., 50 A. to 20 micron) unsupported or free-standing films of silicon nitride having the formula $Si_3N_4$. Essentially, the method comprises a first step of sputtered depositing, on a molybdenum substrate, a thin layer of silicon nitride. The substrate is then placed in an oven, and heated to a temperature ranging from 500° C. to 900° C. (depending, among other things, upon the thickness of the substrate). Chlorine gas is then introduced into the oven, causing the molybdenum substrate to dissolve after some predetermined period of time, leaving the film of silicon nitride intact.

It was unexpectedly found that the film remains intact after the substrate has been dissolved as briefly described above. It is known, for example, by the teaching in the Barnes et al. U.S. patent, No. 3,122,450, that deposition of silicon nitride onto a molybdenum substrate provides a strong chemical bond between the silicon nitride film and the molybdenum. However, it was found that notwithstanding this strong chemical bond, an intact, free-standing film is left after the substrate is dissolved in accordance with the present invention. This unexpected result is attributed to two factors. First, it is believed that the sputter deposition of silicon nitride produces a film layer that has its strength in compression, rather than in tension. This prevents the breaking up of the film as would occur if the film were deposited by other techniques. Second, the gaseous dissolution of the substrate (in the exemplification, by chlorine gas), eliminates the danger of the film breaking up, as would occur if a liquid were used to dissolve the substrate, due to liquid turbulence or surface tension.

DESCRIPTION OF THE PREFERRED EMBODIMENTS

Figures 1, 2:
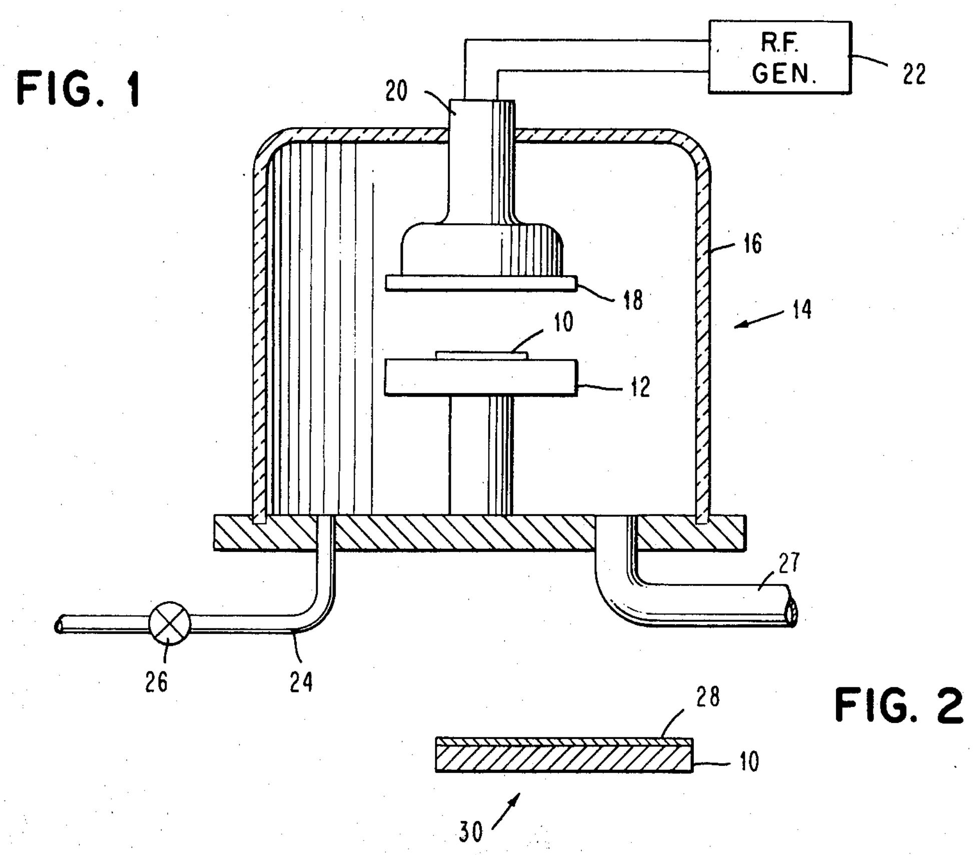
FIG. 1 is a schematic illustration of the preferred apparatus useful in practicing one step of the method of the present invention, i.e., the production of a silicon nitride film or layer on a molybdenum substrate.
FIG. 2 is an enlarged view showing an assembly comprising the silicon nitride film or layer on the molybdenum substrate as produced by the apparatus of FIG. 1.

The method comprising the present invention results in free-standing or unsupported films of silicon nitride that range from 50 A. to 20 microns in thickness. It has been found that these films are coherent and exhibit extremely good strength, while having a melting temperature as high as 1900° C., a low coefficient of thermal expansion, and good dieletric strength. In order to produce the free-standing silicon nitride film, we initially provide a substrate member, which in the preferred embodiment, is a generally rectangular molybdenum plate 10, three or more mils in thickness. The molybdenum plate 10 is placed on the pedestal 12 of an RF sputtering apparatus generally designated by reference numeral 14. Such apparatus is well known to those skilled in the art and is shown schematically in FIG. 1.

The RF sputtering apparatus 14 includes a vacuum chamber 16 in which the pedestal 12 is located, a silicon target 18 supported from an upper support member 20, and the usual RF generator 22. In addition, a flow line 24 and valve 26 communicate the interior of the chamber 16 with a source of nitrogen gas, and outlet line 27 provides means for discharging the gas from chamber 16. The apparatus 14 is shown in greater detail and the technique of sputter depositing silicon nitride films is discussed, for example, in the Journal of the Electrochemical Society, volume 114, No. 8, August 1967, and reference thereto should be made for additional details of that technique.

In particular application, the apparatus 14 is used to produce a 100 A. layer or film 28 (FIG. 2) on the molybdenum substrate 10. In using the sputter deposition apparatus 14 in this application, the following parameters were followed: 300 watts of RF power was applied at a power density factor 4 watts per centimeter; pure nitrogen gas was introduced into the vacuum chamber 16 at $5\times10^{-3}$ torr pressure; the molybdenum substrate 10 was 3 mils in thickness and was heated to approximately 300° C. by a conventional heater such as is normally available in apparatus 14; a four inch diameter, one-quarter inch thick silicon disk was used as the target 18; and, the spacing between the anode and cathode (the support 20 and pedestal 12) was approximately 1.5 inches. The molybdenum substrate 10 was left in the chamber 16 under these conditions for approximately 8.5 minutes. After this time interval, power was turned off and the substrate 10 removed. This resulted in the formation of an assembly 30 comprising the substrate 10 and the thin sputter deposited film or layer 28 of silicon nitride having a thickness of approximately 1000 A.

The above example illustrated the method followed in producing a 1000 A. thick film layer of silicon nitride on the molybdenum substrate 10. The same apparatus 14 was also used to produce a 20 micron film on a molybdenum substrate under essentially the same conditions, except the substrate member was left in the chamber for 27.5 hours. Also, there has been produced a 300 A. film on a silicon substrate using the same apparatus. In this latter case, the substrate was a silicon wafer 1.25 inches in diameter. At the same power, and under essentially the same conditions, it took approximately 2.5 minutes to produce the 300 A. silicon nitride layer on the silicon substrate. It should also be noted that by using the apparatus 14, under essentially the same operating parameters, it takes approximately 41 seconds to produce a 50 A. film on either a molybdenum or silicon substrate.

As noted above, there is a strong chemical bond created between the silicon nitride layer 28 and the substrate 10. Thus, it was unexpected that an unsupported free-standing film could be produced. However, this was accomplished by the apparatus shown schematically in FIG. 3.

Figures 3, 4:
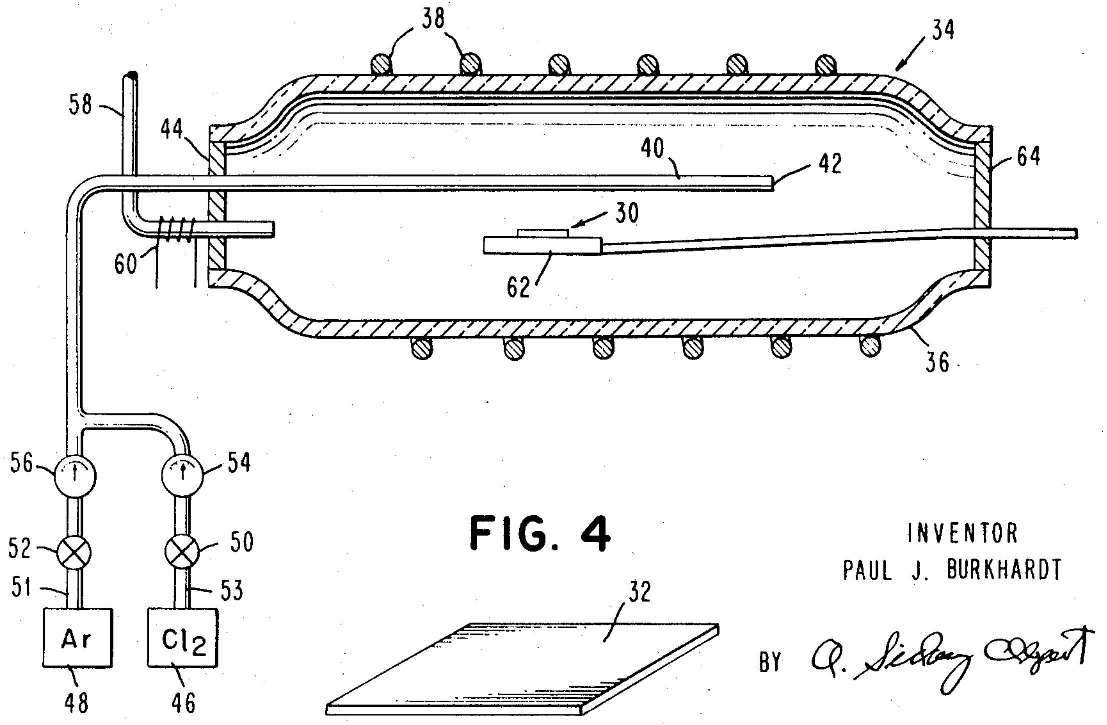
FIG. 3 is a schematic view illustrating the preferred apparatus for practicing the step of gaseous dissolution of the molybdenum substrate.
FIG. 4 is a view illustrating the product produced by the method of the present invention; i.e., an extremely thin free-standing film of silicon nitride.

The free-standing film 32 as shown in FIG. 4 was produced by gaseous dissolution of the substrate 10. It was recognized that the molybdenum substrate has a low coefficient of expansion, and therefore that the film or layer 28 would not be cracked as the temperature of the molybdenum was changed during its cycling through the apparatus 34. The apparatus 34 includes a hollow tubular quartz chamber or oven 36 around which is located a heating coil 38. Mounted in the chamber 36 and extending slightly over halfway through the chamber is a gas input tube 40 open at its inner end 42. The gas input tube 40 is mounted through a closure member 44, and is used to introduce either chlorine gas from tank 46 or argon gas from tank 48 into the chamber 36. In this regard, valves 50 and 52 and flow meters 54 and 56 in the lines 51 and 63 permit the control of the gases in tank 46 and 48. An exhaust tube 58 also is mounted in the closure member 44, and a heating coil 60 is wrapped around the exhaust tube 38 for a purpose to be explained hereinafter.

In order to form the free-standing film 32, it is necessary to dissolve the molybdenum substrate 10. In the practice of the invention, initially, the heating coil 38 is used to produce a temperature ranging from 500° C. to 900° C. within the chamber 36. An assembly such as the assembly 30 produced by the apparatus 14 shown in FIG. 1, is mounted on a pallet or table 62 and located in the chamber 36, and the chamber closed by closure member 64. In the example mentioned above, wherein the 1000 A. layer 28 was produced, the furnace was at a temperature of 800° C., and the assembly 30 was left in the chamber 36 for approximately one-half hour. After the desired temperature was reached and the assembly located in the chamber 36, chlorine gas was introduced into the chamber 36 through the tube 40. It may be desirable to utilize the argon gas as a carrier for the chlorine, and in the preferred embodiment, i.e., the production of free-standing film 32, a mixture of ten percent chlorine gas and ninety percent argon gas was used. The chlorine gas reacts with the molybdenum substrate to produce molybdenum chlorides which are volatile at the 800° C. temperature within the chamber 36. These vapors are exhausted out tube 58. The heating coil 60 is provided to keep the molybdenum chlorides from condensing within the relatively cool exhaust tube 58.

It should be noted that a commercial grade chlorine gas may be used in the practice of the invention as described above. It is well known, of course, that commercial chlorine gas contains oxygen. However, it was recognized that oxygen within chamber 36 during the dissolution reaction between the molybdenum and chlorine will merely produce molybdenum oxide, and that molybdenum oxide is also volatile at the 800° C. temperature within the chamber 36. Therefore, although molybdenum oxides are also formed by a reaction between the oxygen and molybdenum these oxides are also expelled through the exhaust tube 58. Thus, when molybdenum is used as the substrate, no problem is encountered by using commercial grade chlorine gas. However, it was found that when silicon is used as the substrate material, as noted above, commercial chlorine is not suitable. This is due to the fact that while silicon chloride is volatile and will be expelled through the exhaust tube 58, silicon oxide is not volatile. Accordingly, when commercial grade chlorine and a silicon substrate are used a coating is formed on the silicon nitride film which is difficult to remove. When a silicon substrate is used to practice the invention, it is necessary to use purified chlorine gas. Since purified chlorine gas is much more expensive than commercial grade chlorine gas, it is therefore more desirable to use the molybdenum substrate 10.

After approximately one half hour at 800° C. in the chlorine gas atmosphere, the molybdenum substrate is completely dissolved and the molybdenum chlorides and oxides exhausted from the oven chamber 36. When the pallet 62 is removed from the oven, the film 32 remains. The film comes out completely dry, intact and ready for use. With regard to the film 32 of 1000 A. shown in FIG. 4, it was found to be quite flexible, and to have high dielectric strength (i.e., a dielectric constant of approximately 8). The film 32 was therefore entirely suitable for use in such applications as in the fabrication of thin film capacitors.

While the preferred embodiment has been shown, together with certain alternatives, such as the use of a silicon substrate, certain other alternatives will be readily apparent to those skilled in the art. For example, bromine gas could be used in place of the chlorine gas to effect gaseous dissolution of the molybdenum substrate. In addition, it is known that gaseous oxygen will dissolve molybdenum at high temperatures, and accordingly, either of these two gases (i.e., bromine and oxygen) may be also used, if desired, in the practice of the invention. It was found that the gaseous dissolution of the molybdenum substrate was especially effective as there is no turbulence, surface tension or other potential film disturbing effects at the silicon nitride-molybdenum interface which might break up the film. In addition, as mentioned above, the molybdenum substrate has a low coefficient of expansion, and therefore when it experiences temperature changes, such as when it is taken out of the chamber 16, it does not change in dimension and will not crack the film layer 28. The molybdenum substrate 10 actually used in practice was 3 mils thick, which was found to be readily removable by chlorine gas dissolution. While a thicker molybdenum substrate might be used, it would require additional time in the oven to affect its removal. Additionally, it is possible, within the scope of this invention, to form thin, free-standing films of silicon dioxide by using the apparatus illustrated in the various figures, and in accordance with the present invention.

While the invention has been particularly shown and described with reference to a preferred embodiment thereof, it will be understood by those skilled in the art that various changes in form and details may be made therein without departing from the spirit and scope of the invention.

I claim:

1. A method of forming an unsupported thin film of silicon nitride comprising:

providing a substrate member of molybdenum;

producing sputter-depositing on the substrate member a layer of silicon nitride of a thickness ranging from 50 A. to 20 microns; and removing the substrate member by heating it to a temperature ranging from 500° C. to 900° C. and reacting it with chlorine gas.

2. The method of claim 1 wherein the step of producing on the substrate member a layer of silicon nitride includes heating the substrate member to a temperature of approximately 300° C. and sputter-depositing the silicon nitride onto the substrate member.

3. The method of claim 1 wherein the step providing a substrate member comprises providing a molybdenum substrate having a thickness of approximately 3 mils.

4. A method of producing a free-standing thin film comprising:

providing a substrate member selected from the group consisting of molybdenum and silicon;

sputter-depositing on the substrate member a thin layer of silicon nitride;

placing the substrate member in an oven and heating it to a temperature ranging from 500° C. to 900° C.; and introducing into the oven a gas selected from the group consisting of chlorine and bromine and when the substrate is molybdenum, oxygen thereby dissolving the substrate member and leaving a uniform intact free-standing film.

No references cited.

ROBERT K. MIHALEK, Primary Examiner

U.S. Cl. X.R.

264—317